(12) United States Patent
Korus

(10) Patent No.: US 12,480,786 B2
(45) Date of Patent: Nov. 25, 2025

(54) DISTANCE ESTIMATION

(71) Applicant: NICOVENTURES TRADING LIMITED, London (GB)

(72) Inventor: Anton Korus, Derby (GB)

(73) Assignee: NICOVENTURES TRADING LIMITED, London (GB)

( * ) Notice: Subject to any disclaimer, the term of this patent is extended or adjusted under 35 U.S.C. 154(b) by 217 days.

(21) Appl. No.: 18/254,713

(22) PCT Filed: Nov. 30, 2021

(86) PCT No.: PCT/GB2021/053114
§ 371 (c)(1),
(2) Date: May 26, 2023

(87) PCT Pub. No.: WO2022/118006
PCT Pub. Date: Jun. 9, 2022

(65) Prior Publication Data
US 2024/0003712 A1    Jan. 4, 2024

(30) Foreign Application Priority Data

Dec. 1, 2020  (GB) .................................. 2018945

(51) Int. Cl.
*G01D 5/20*      (2006.01)
*H02M 3/335*     (2006.01)

(52) U.S. Cl.
CPC .............. *G01D 5/20* (2013.01); *H02M 3/335* (2013.01)

(58) Field of Classification Search
CPC .... G01D 5/20; G01R 33/0354; G01R 33/323; G01R 33/00; G01R 33/0035;
(Continued)

(56) References Cited

U.S. PATENT DOCUMENTS 6,681,998 B2 * 1/2004 Sharpe ................ A61M 11/042
392/314
2014/0158678 A1   6/2014 Thomann et al.
(Continued)

FOREIGN PATENT DOCUMENTS

CN   110179160 A   8/2019
JP   2001102162 A  4/2001
(Continued)

OTHER PUBLICATIONS

International Search Report and Written Opinion received for PCT Patent Application No. PCT/GB2021/053114, mailed on Mar. 10, 2022, 12 pages.
(Continued)

*Primary Examiner* — Jermele M Hollington
*Assistant Examiner* — Taqi R Nasir
(74) *Attorney, Agent, or Firm* — Burr & Forman

(57) ABSTRACT

A method, apparatus and computer program are disclosed and can include applying a pulse edge to a resonant circuit including an inductive element (for inductively heating a susceptor) and a capacitor, wherein the applied pulse edge induces a pulse response between the capacitor and the inductive element of the resonant circuit, wherein the pulse response has a resonant frequency; determining a period or frequency of the resonant frequency of the pulse response; and converting the determined period or frequency into a distance based, at least in part, on a distance gradient and a first calibration measurement. The distance is based on a separation between the inductive element and the susceptor and the first calibration measurement includes the separation between the inductive element and the susceptor at a calibration temperature.

24 Claims, 8 Drawing Sheets

(58) Field of Classification Search
CPC ............ G01R 33/0023; G01R 33/0017; G01R 31/3191; H02M 3/335; H10N 60/12; G01B 7/004; G01C 17/38
See application file for complete search history.

(56) References Cited

U.S. PATENT DOCUMENTS

| | | |
|---|---|---|
| 2020/0022412 A1 | 1/2020 | Abi Aoun et al. |
| 2020/0128878 A1* | 4/2020 | Stura ................ A24F 47/00 |
| 2021/0137170 A1* | 5/2021 | Taurino ............. A24F 40/42 |

FOREIGN PATENT DOCUMENTS

| | | |
|---|---|---|
| JP | 2014093161 A | 5/2014 |
| KR | 1020190130021 A | 11/2019 |
| TW | 201332462 A | 8/2013 |
| WO | 2019002377 A1 | 1/2019 |
| WO | 2020008008 A1 | 1/2020 |
| WO | 2020043900 A1 | 3/2020 |

OTHER PUBLICATIONS

Office Action (with English Translation) issued in corresponding Korean Patent Application No. 10-2023-7022118 mailed Jan. 24, 2025, all pages cited in its entirety.

* cited by examiner

DISTANCE ESTIMATION

PRIORITY CLAIM

The present application is a National Phase entry of PCT Application No. PCT/GB2021/053114, filed Nov. 30, 2021, which claims priority from GB Application No. 2018945.2, filed Dec. 1, 2020, each of which is hereby fully incorporated herein by reference.

TECHNICAL FIELD

The present specification relates to distance estimation, for example to estimating a distance between a susceptor an an inductive element used for inductively heating said susceptor.

BACKGROUND

Smoking articles, such as cigarettes, cigars and the like burn tobacco during use to create tobacco smoke. Attempts have been made to provide alternatives to these articles by creating products that release compounds without combusting. For example, tobacco heating devices heat an aerosol generating substrate such as tobacco to form an aerosol by heating, but not burning, the substrate. A susceptor may be used to heat such a substrate. A distance between such a susceptor and an inductive element used for inductively heating the susceptor may be a parameter of interest.

SUMMARY

In a first aspect, this specification describes a method comprising: applying a pulse edge to a resonant circuit comprising an inductive element, for inductively heating a susceptor, and a capacitor, wherein the applied pulse edge induces a pulse response between the capacitor and the inductive element of the resonant circuit, wherein the pulse response has a resonant frequency; determining a period or frequency of the resonant frequency of said pulse response; and converting the determined period or frequency into a distance based, at least in part, on a distance gradient and a first calibration measurement, wherein the distance is based on a separation between the inductive element and the susceptor and the first calibration measurement comprises the separation between the inductive element and the susceptor at a calibration temperature (e.g. room temperature). The pulse edge may form part of an off-resonance pulse.

The distance gradient may comprise a rate of change of distance with respect to apparent temperature.

In some example embodiments, converting the determined period or frequency into the distance estimate may comprise: converting the determined period or frequency into an apparent temperature based on a temperature gradient and a temperature calibration measurement; and converting the apparent temperature into the distance estimate based on the distance gradient and the first calibration measurement. The temperature gradient may comprise a rate of change of the resonant frequency of said pulse response with respect to temperature. The temperature calibration measurement may define a first period of the resonant frequency of said pulse response and a first temperature. The temperature calibration measurement may be obtained by subtracting the product of said gradient and a calibration temperature from a period or frequency of said pulse response at said calibration temperature.

The method may further comprise obtaining said first calibration measurement.

The method may further comprise determining said distance gradient.

In a second aspect, this specification describes an apparatus comprising: a resonant circuit comprising an inductive element and a capacitor, wherein the inductive element is for inductively heating a susceptor; a circuit (e.g. an H-bridge circuit) for applying a pulse edge to said resonant circuit, wherein the applied pulse edge induces a pulse response between the capacitor and the inductive element of the resonant circuit, wherein the pulse response has a resonant frequency; and a processor for: determining a period or frequency of the resonant frequency of said pulse response and converting the determined period or frequency into a distance based, at least in part, on a distance gradient and a first calibration measurement, wherein the distance is based on a separation between the inductive element and the susceptor and the first calibration measurement comprises the separation between the inductive element and the susceptor at a calibration temperature. The inductive element and said capacitor may be connected in series. Alternatively, the inductive element and said capacitor are connected in parallel.

The distance gradient may comprise a rate of change of distance with respect to apparent temperature.

The processor may further: convert the determined period or frequency into an apparent temperature based on a temperature gradient and a temperature calibration measurement; and convert the apparent temperature into the distance estimate based on the distance gradient and the first calibration measurement.

The processor may be used for determining said distance gradient.

In a third aspect, this specification describes a non-combustible aerosol generating device comprising an apparatus as described above with reference to the second aspect. The aerosol generating device may be configured to receive a removable article comprising an aerosol generating material (which aerosol generating material may comprise an aerosol generating substrate and an aerosol forming material). The removable article may include a susceptor arrangement.

In a fourth aspect, this specification describes kit of parts comprising an article for use in a non-combustible aerosol generating system, wherein the non-combustible aerosol generating system comprises an apparatus as described above with reference to the second aspect or an aerosol generating device as described above with reference to the third aspect. The article may be a removable article comprising an aerosol generating material.

In a fifth aspect, this specification describes a computer program comprising instructions for causing an apparatus to perform at least the following: applying a pulse edge to a resonant circuit comprising an inductive element, for inductively heating a susceptor, and a capacitor, wherein the applied pulse edge induces a pulse response between the capacitor and the inductive element of the resonant circuit, wherein the pulse response has a resonant frequency; determining a period or frequency of the resonant frequency of said pulse response; and converting the determined period or frequency into a distance based, at least in part, on a distance gradient and a first calibration measurement, wherein the distance is based on a separation between the inductive element and the susceptor and the first calibration measurement comprises the separation between the inductive element and the susceptor at a calibration temperature. The computer program may be further configured to perform any aspect of the method described above with reference to the first aspect.

BRIEF DESCRIPTION OF THE DRAWINGS

Example embodiments will now be described, by way of example only, with reference to the following schematic drawings, in which.

Figure 1:
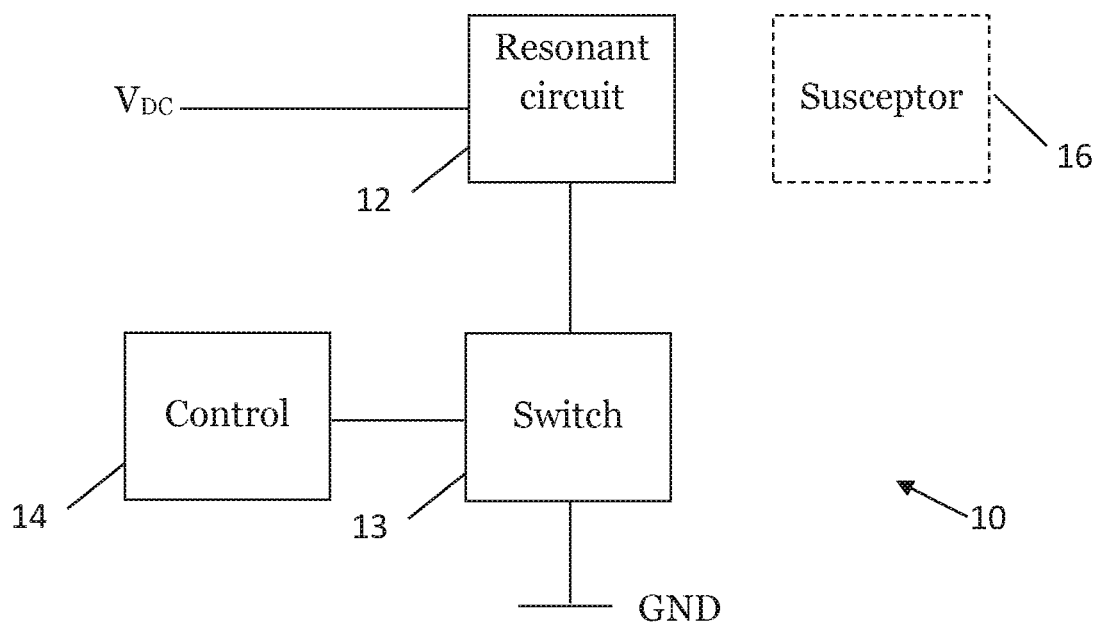
FIG. 1 is a block diagram of a system in accordance with an example embodiment.

DETAILED DESCRIPTION OF THE DRAWINGS

As used herein, the term "aerosol delivery device" is intended to encompass systems that deliver a substance to a user, and includes:

- non-combustible aerosol provision systems that release compounds from an aerosolizable material without combusting the aerosolizable material, such as electronic cigarettes, tobacco heating products, and hybrid systems to generate aerosol using a combination of aerosolizable materials; and
- articles comprising aerosolizable material and configured to be used in one of these non-combustible aerosol provision systems.

According to the present disclosure, a "combustible" aerosol provision system is one where a constituent aerosolizable material of the aerosol provision system (or component thereof) is combusted or burned in order to facilitate delivery to a user.

According to the present disclosure, a "non-combustible" aerosol provision system is one where a constituent aerosolizable material of the aerosol provision system (or component thereof) is not combusted or burned in order to facilitate delivery to a user.

In embodiments described herein, the delivery system is a non-combustible aerosol provision system, such as a powered non-combustible aerosol provision system.

In one embodiment, the non-combustible aerosol provision system is an electronic cigarette, also known as a vaping device or electronic nicotine delivery system (END), although it is noted that the presence of nicotine in the aerosolizable material is not a requirement.

In one embodiment, the non-combustible aerosol provision system is a tobacco heating system, also known as a heat-not-burn system.

In one embodiment, the non-combustible aerosol provision system is a hybrid system to generate aerosol using a combination of aerosolizable materials, one or a plurality of which may be heated. Each of the aerosolizable materials may be, for example, in the form of a solid, liquid or gel and may or may not contain nicotine. In one embodiment, the hybrid system comprises a liquid or gel aerosolizable material and a solid aerosolizable material. The solid aerosolizable material may comprise, for example, tobacco or a non-tobacco product.

Typically, the non-combustible aerosol provision system may comprise a non-combustible aerosol provision device and an article for use with the non-combustible aerosol provision system. However, it is envisaged that articles which themselves comprise a means for powering an aerosol generating component may themselves form the non-combustible aerosol provision system.

In one embodiment, the non-combustible aerosol provision device may comprise a power source and a controller. The power source may be an electric power source or an exothermic power source. In one embodiment, the exothermic power source comprises a carbon substrate which may be energized so as to distribute power in the form of heat to an aerosolizable material or heat transfer material in proximity to the exothermic power source. In one embodiment, the power source, such as an exothermic power source, is provided in the article so as to form the non-combustible aerosol provision.

In one embodiment, the article for use with the non-combustible aerosol provision device may comprise an aerosolizable material, an aerosol generating component, an aerosol generating area, a mouthpiece, and/or an area for receiving aerosolizable material.

In one embodiment, the aerosol generating component is a heater capable of interacting with the aerosolizable material so as to release one or more volatiles from the aerosolizable material to form an aerosol. In one embodiment, the aerosol generating component is capable of generating an aerosol from the aerosolizable material without heating. For example, the aerosol generating component may be capable of generating an aerosol from the aerosolizable material without applying heat thereto, for example via one or more of vibrational, mechanical, pressurization or electrostatic means.

In one embodiment, the aerosolizable material may comprise an active material, an aerosol forming material and optionally one or more functional materials. The active material may comprise nicotine (optionally contained in tobacco or a tobacco derivative) or one or more other non-olfactory physiologically active materials. A non-olfactory physiologically active material is a material which is included in the aerosolizable material in order to achieve a physiological response other than olfactory perception. The active substance as used herein may be a physiologically active material, which is a material intended to achieve or enhance a physiological response. The active substance may for example be selected from nutraceuticals, nootropics, psychoactives. The active substance may be naturally occurring or synthetically obtained. The active substance may comprise for example nicotine, caffeine, taurine, theine, vitamins such as B6 or B12 or C, melatonin, cannabinoids, or constituents, derivatives, or combinations thereof. The active substance may comprise one or more constituents, derivatives or extracts of tobacco, cannabis or another botanical. In some embodiments, the active substance comprises nicotine. In some embodiments, the active substance comprises caffeine, melatonin or vitamin B12.

The aerosol forming material may comprise one or more of glycerine, glycerol, propylene glycol, diethylene glycol, triethylene glycol, tetraethylene glycol, 1,3-butylene glycol, erythritol, meso-Erythritol, ethyl vanillate, ethyl laurate, a diethyl suberate, triethyl citrate, triacetin, a diacetin mixture, benzyl benzoate, benzyl phenyl acetate, tributyrin, lauryl acetate, lauric acid, myristic acid, and propylene carbonate.

The one or more functional materials may comprise one or more of flavors, carriers, pH regulators, stabilizers, and/or antioxidants.

In one embodiment, the article for use with the non-combustible aerosol provision device may comprise aerosolizable material or an area for receiving aerosolizable material. In one embodiment, the article for use with the non-combustible aerosol provision device may comprise a mouthpiece. The area for receiving aerosolizable material may be a storage area for storing aerosolizable material. For example, the storage area may be a reservoir. In one embodiment, the area for receiving aerosolizable material may be separate from, or combined with, an aerosol generating area.

Aerosolizable material, which also may be referred to herein as aerosol generating material, is material that is capable of generating aerosol, for example when heated, irradiated or energized in any other way. Aerosolizable material may, for example, be in the form of a solid, liquid or gel which may or may not contain nicotine and/or flavorants. In some embodiments, the aerosolizable material may comprise an "amorphous solid", which may alternatively be referred to as a "monolithic solid" (i.e. non-fibrous). In some embodiments, the amorphous solid may be a dried gel. The amorphous solid is a solid material that may retain some fluid, such as liquid, within it.

The aerosolizable material may be present on a substrate. The substrate may, for example, be or comprise paper, card, paperboard, cardboard, reconstituted aerosolizable material, a plastics material, a ceramic material, a composite material, glass, a metal, or a metal alloy.

A consumable is an article comprising or consisting of aerosol-generating material, part or all of which is intended to be consumed during use by a user. A consumable may comprise one or more other components, such as an aerosol-generating material storage area, an aerosol-generating material transfer component, an aerosol generation area, a housing, a wrapper, a mouthpiece, a filter and/or an aerosol-modifying agent. A consumable may also comprise an aerosol generator, such as a heater, that emits heat to cause the aerosol-generating material to generate aerosol in use. The heater may, for example, comprise combustible material, a material heatable by electrical conduction, or a susceptor.

FIG. 1 is a block diagram of a system, indicated generally by the reference numeral 10, in accordance with an example embodiment. The system 10 comprises a resonant circuit 12 (e.g. an LC resonant circuit), a switching module 13 and a control module 14. A power source ($V_{DC}$) in the form of a direct current (DC) voltage supply is provided to the resonant circuit 12. The power source may, for example, be supplied by a battery.

The resonant circuit 12 may comprise an inductor and a capacitor connected in parallel. The resonant circuit may be used for inductively heating a susceptor arrangement 16 to heat an aerosol generating material, as discussed in detail below. Heating the aerosol generating material may thereby generate an aerosol, as discussed further below.

The control module 14 provides a control signal for switching the switching module 13 between a first state and a second state. In the first state, a current is drawn from the voltage supply through the resonant circuit 12 (whereby an inductor of the resonant circuit is charged). In the second state, the first switching module is non-conducting. If the inductor of the resonant circuit 12 is charged when the switching module 13 switches from the first state to the second state, then the resonant circuit will resonate, with charge flowing from the inductor to the capacitor and back again.

The system 10 can be used with a wide variety of susceptor arrangements.

Figure 2:
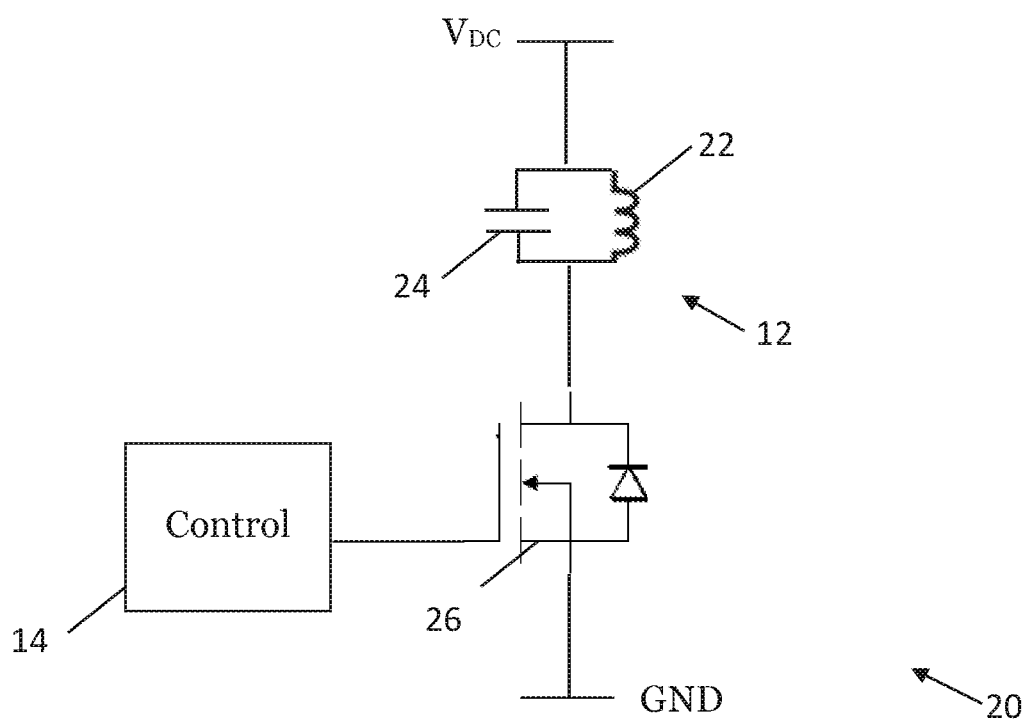
FIG. 2 is a block diagram of a circuit in accordance with an example embodiment.

FIG. 2 is a block diagram of a circuit, indicated generally by the reference numeral 20, in accordance with an example embodiment. The circuit 20 may be used in an example implementation of the system 10 described above.

The circuit 20 includes the control module 14 of the system 10 described above. The circuit 20 further comprises an inductor 22 and a capacitor 24 arranged in parallel (implementing the resonant circuit 12) and a transistor 26 (implementing the switching module 13). The resonant circuit formed of the inductor 22 and the capacitor 24 are for inductively heating a susceptor arrangement (not shown) as discussed above.

The transistor 26 has a first state and a second state dependent on the output of the control module 14. In the first state, the transistor 26 is conducting such that a varying current generated from the voltage supply $V_{DC}$ flows through the inductor 22 (thereby charging the inductor). The voltage supply may be provided by a battery (e.g. a battery of an aerosol generating device). The battery voltage may be variable (to a limited degree) over time.

In the second state, the first switching arrangement is non-conducting, such that the inductor 22 (which has been charged in the first state) discharges, thereby charging the capacitor 24. If the switching arrangement stayed in the second state, the resonant circuit 12 would resonate at a frequency dependent on the inductance (L) and capacitance (C) of the inductor 22 and the capacitor 24, given by the formula:

$$f = \frac{1}{2\pi LC}.$$

A number of other arrangements may be provided for heating a susceptor, such as the susceptor 16.

Figure 3:
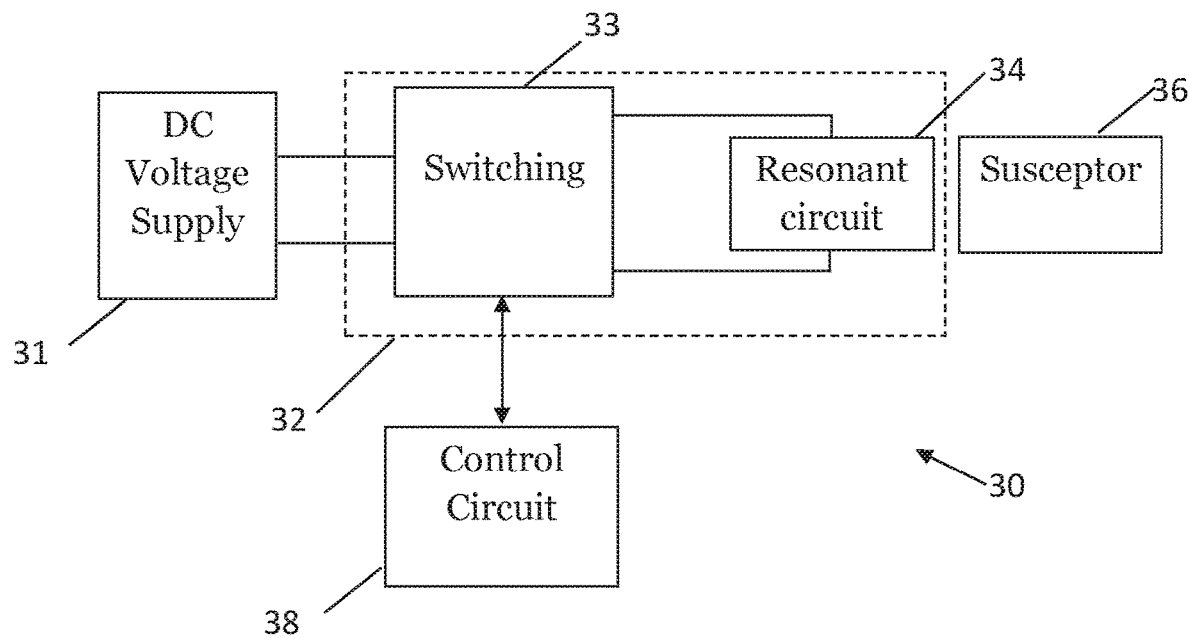
FIGS. 3 and 4 are block diagrams of systems in accordance with example embodiments.

FIG. 3 is a block diagram of a system, indicated generally by the reference numeral 30, in accordance with an example embodiment. The system 30 has a number of similarities with the system 10 described above.

The system 30 comprises a power source in the form of a direct current (DC) voltage supply 31, a switching arrangement 33, a resonant circuit 34, a susceptor arrangement 36, and a control circuit 38. The switching arrangement 33 and the resonant circuit 34 may be coupled together in an inductive heating arrangement 32 that can be used to heat the susceptor 36. The susceptor 36 may be similar to the susceptor 16 described above.

As discussed in detail below, the resonant circuit 34 may comprise a capacitor and one or more inductive elements for inductively heating the susceptor arrangement 36 to heat an aerosol generating material. Heating the aerosol generating material may thereby generate an aerosol. As discussed further below, the capacitor and inductor of the resonant circuit 34 may be provided in series (in contrast to the parallel connection of the circuit 20).

The switching arrangement 33 may enable an alternating current to be generated from the DC voltage supply 31 (under the control of the control circuit 38). The alternating current may flow through the one or more inductive elements and may cause the heating of the susceptor arrangement 36. The switching arrangement may comprise a plurality of transistors. Example DC-AC converters include H-bridge or inverter circuits, examples of which are discussed below.

A susceptor (such as the susceptors 16 and 36 described above) is a material that is heatable by penetration with a varying magnetic field, such as an alternating magnetic field. The heating material may be an electrically-conductive material, so that penetration thereof with a varying magnetic field causes induction heating of the heating material. The heating material may be magnetic material, so that penetration thereof with a varying magnetic field causes magnetic hysteresis heating of the heating material. The heating material may be both electrically-conductive and magnetic, so that the heating material is heatable by both heating mechanisms.

Induction heating is a process in which an electrically-conductive object is heated by penetrating the object with a varying magnetic field. The process is described by Faraday's law of induction and Ohm's law. An induction heater may comprise an electromagnet and a device for passing a varying electrical current, such as an alternating current, through the electromagnet. When the electromagnet and the object to be heated are suitably relatively positioned so that the resultant varying magnetic field produced by the electromagnet penetrates the object, one or more eddy currents are generated inside the object. The object has a resistance to the flow of electrical currents. Therefore, when such eddy currents are generated in the object, their flow against the electrical resistance of the object causes the object to be heated. This process is called Joule, ohmic, or resistive heating. An object that is capable of being inductively heated is known as a susceptor.

In one embodiment, the susceptor is in the form of a closed circuit. It has been found in some embodiments that, when the susceptor is in the form of a closed circuit, magnetic coupling between the susceptor and the electromagnet in use is enhanced, which results in greater or improved Joule heating.

Magnetic hysteresis heating is a process in which an object made of a magnetic material is heated by penetrating the object with a varying magnetic field. A magnetic material can be considered to comprise many atomic-scale magnets, or magnetic dipoles. When a magnetic field penetrates such material, the magnetic dipoles align with the magnetic field. Therefore, when a varying magnetic field, such as an alternating magnetic field, for example as produced by an electromagnet, penetrates the magnetic material, the orientation of the magnetic dipoles changes with the varying applied magnetic field. Such magnetic dipole reorientation causes heat to be generated in the magnetic material.

When an object is both electrically-conductive and magnetic, penetrating the object with a varying magnetic field can cause both Joule heating and magnetic hysteresis heating in the object. Moreover, the use of magnetic material can strengthen the magnetic field, which can intensify the Joule heating.

In each of the above processes, as heat is generated inside the object itself, rather than by an external heat source by heat conduction, a rapid temperature rise in the object and more uniform heat distribution can be achieved, particularly through selection of suitable object material and geometry, and suitable varying magnetic field magnitude and orientation relative to the object. Moreover, as induction heating and magnetic hysteresis heating do not require a physical connection to be provided between the source of the varying magnetic field and the object, design freedom and control over the heating profile may be greater, and cost may be lower.

Figure 4:
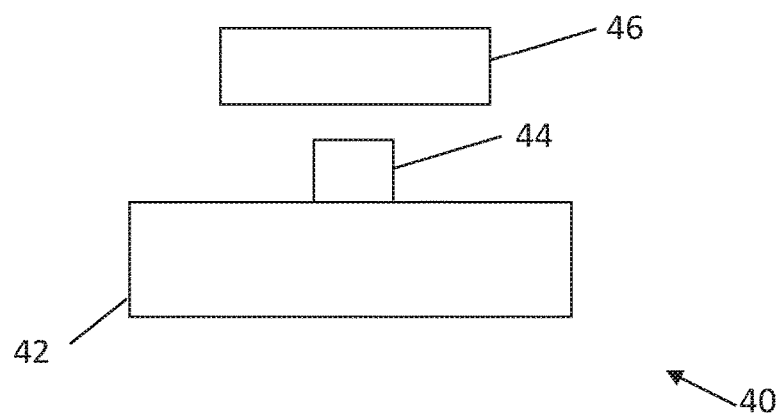

FIG. 4 is a block diagram of a system, indicated generally by the reference numeral 40, in accordance with example embodiments. The system 40 comprises a substrate 42 (such as a printed circuit board) on which a number of circuit element, including an inductor 44, are provided. The system 40 also comprises a susceptor 46. The inductor 44 may form part of the resonant circuits 12 or 34 and may therefore be used for inductively heating the susceptor 46. The inductor 44 may, for example, be a spiral inductor.

The susceptor 46 may be retained by a supporting mechanism (not shown). The susceptor 46 is separated from the inductor 44 by a short distance. The separation between the inductor 44 and the susceptor 46 may be important to the functionality of an inductive heating system. As discussed in detail below, the separation between the inductor 44 and the susceptor 46 may be measurable.

Figure 5:
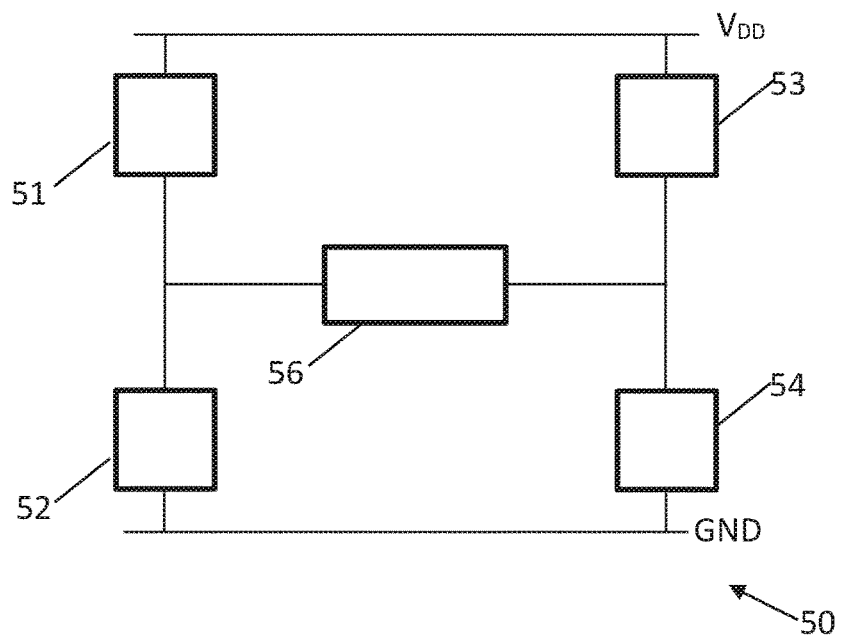
FIGS. 5 and 6 are block diagrams of circuits in accordance with example embodiments.

FIG. 5 is a block diagram of a circuit, indicated generally by the reference numeral 50, in accordance with an example embodiment. The circuit 50 comprises a first switch 51, a second switch 52, a third switch 53, a fourth switch 54 and a resonant circuit 56. The first to fourth switches 51 to 54 may be implemented using transistors, as discussed further below.

The first to fourth switches 51 to 54 form an H-bridge bridge circuit that may be used to apply pulses to the resonant circuit 56. Thus the first to fourth switches 51 to 54 are an example implementation of the switching arrangement 33 and the resonant circuit 56 is an example of the resonant circuit 36 described above.

The first and second switches 51 and 52 form a first limb of the bridge circuit and the third and fourth switches 53 and 54 form a second limb. More specifically, the first switch 51 can selectively provide a connection between a first power source (labelled $V_{DD}$ in FIG. 5) and a first connection point, the second switch 52 can selectively provide a connection between the first connection point and ground, the third switch 53 can selectively provide a connection between the first power source and a second connection point and the fourth switch 54 can selectively provide a connection between the second connection point and ground. The resonant circuit 56 is provided between the first and second connection points.

Figure 6:
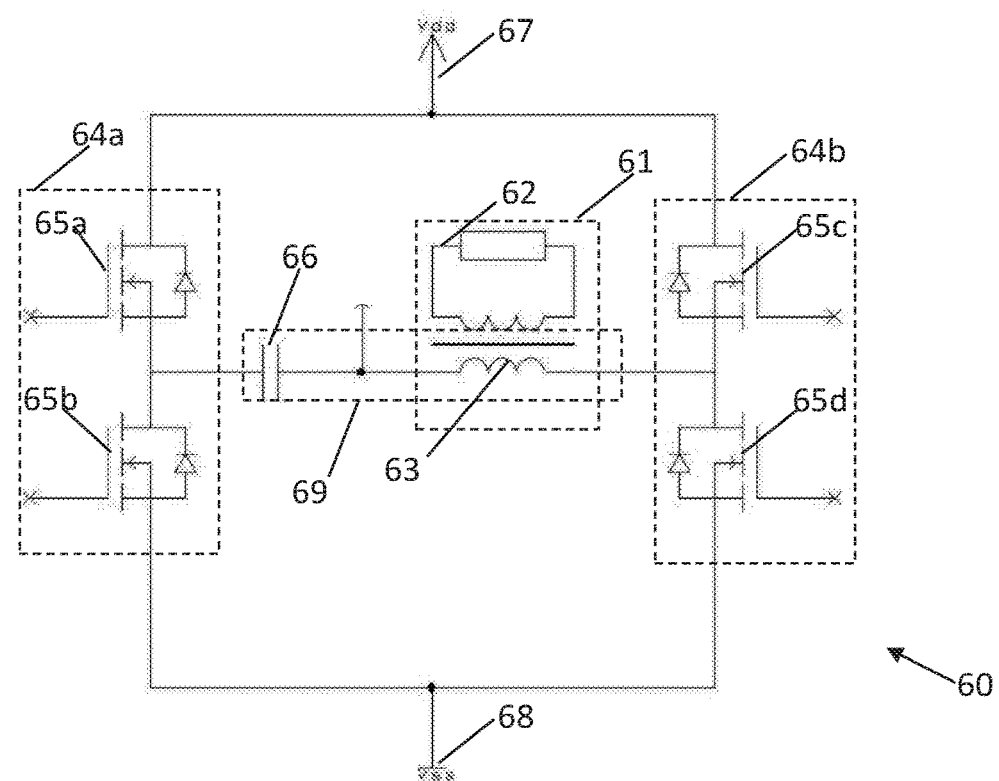

FIG. 6 is a block diagram of a circuit, indicated generally by the reference numeral 60, in accordance with an example embodiment. The circuit 60 is an example implementation of the circuit 50 described above.

The circuit 60 comprises a positive terminal 67 and a negative (ground) terminal 68 (that are an example implementation of the DC voltage supply 31 of the system 30 described above). The circuit 60 comprises a switching arrangement 64 (implementing the switching arrangement 33 described above), where the switching arrangement 64 comprises a bridge circuit (e.g. an H-bridge circuit, such as an FET H-bridge circuit). The switching arrangement 64 comprises a first limb 64a and a second limb 64b, where the first limb 64a and the second limb 64b are coupled by a resonant circuit 69 (which resonant circuit implements the resonant circuits 34 and 56 described above). The first limb 64a comprises switches 65a and 65b (implementing the switches 51 and 52 described above), and the second limb 64b comprises switches 65c and 65d (implementing the switches 53 and 54 described above). The switches 65a, 65b, 65c, and 65d may be transistors, such as field-effect transistors (FETs), and may receive inputs from a controller, such as the control circuit 38 of the system 10.

The resonant circuit 69 comprises a capacitor 66 and an inductive element 63 such that the resonant circuit 69 may be an LC resonant circuit. The circuit 60 further shows a susceptor equivalent circuit 62 (thereby implementing the susceptor arrangement 16). The susceptor equivalent circuit 62 comprises a resistance and an inductive element that indicate the electrical effect of an example susceptor arrangement 36. When a susceptor is present, the susceptor arrangement 62 and the inductive element 63 may act as a transformer 61. Transformer 61 may produce a varying magnetic field such that the susceptor is heated when the circuit 60 receives power. During a heating operation, in which the susceptor arrangement 36 is heated by the inductive arrangement, the switching arrangement 64 is driven (e.g., by control circuit 38) such that each of the first and second branches are coupled in turn such that an alternating current is passed through the resonant circuit 69. The resonant circuit 69 will have a resonant frequency, which is based in part on the susceptor arrangement 36, and the control circuit 38 may be configured to control the switching arrangement 64 to switch at the resonance frequency or a frequency close to the resonant frequency. Driving the switching circuit at or close to resonance helps improve efficiency and reduces the energy being lost to the switching elements (which causes unnecessary heating of the switching elements). In an example in which the susceptor comprises an aluminum foil is to be heated, the switching arrangement 64 may be driven at a frequency of around 2.5 MHz. However, in other implementations, the frequency may, for example, be anywhere between 500 kHz to 4 MHz.

Figure 7:
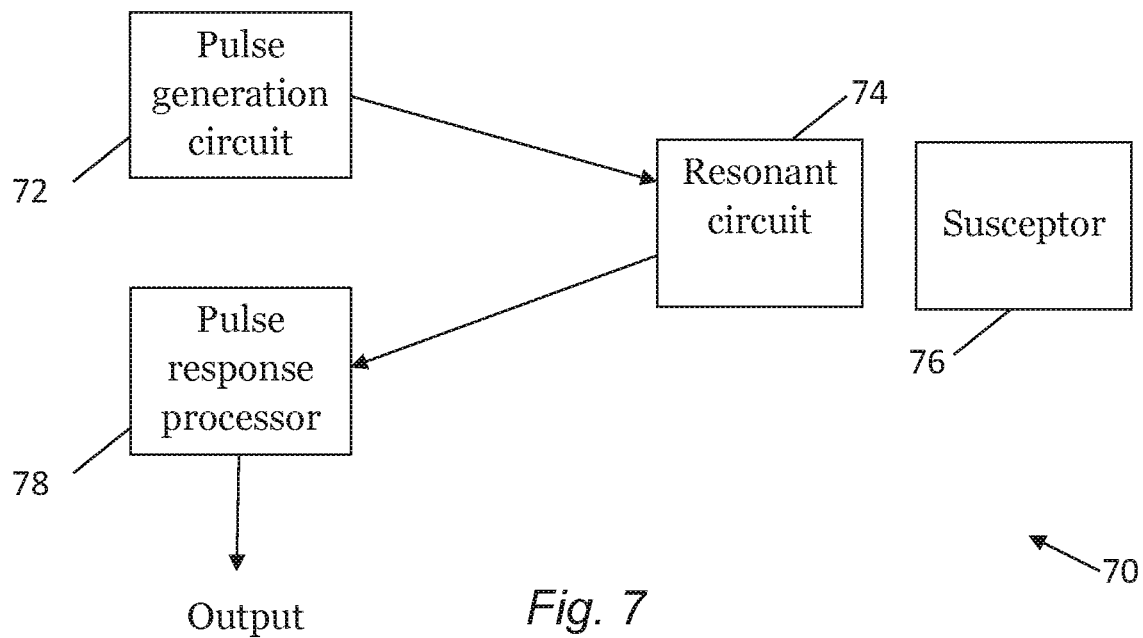
FIG. 7 is a block diagram of a system in accordance with an example embodiment.

FIG. 7 is a block diagram of a system, indicated generally by the reference numeral 70, in accordance with an example embodiment.

The system 70 comprises a pulse generation circuit 72, a resonant circuit 74 (such as the resonant circuits 12, 34, 56 and 69), a susceptor 76 (such as the susceptors 16, 36 and 46) and a pulse response processor 78. The pulse generation circuit 72 and the pulse response processor 74 may be implemented as part of the control circuits 14 or 38 of the systems 10 and 30 described above.

The pulse generation circuit 72 may be implemented using the switches 13 and 26 or the switching arrangements of the circuits 50 and 60 described above in order to generate a pulse (e.g. pulse edges) by switching between positive and negative voltage sources.

The pulse response processor 78 may determine one or more performance metrics (or characteristics) of the resonant circuit 74 and the susceptor 76 based on the pulse response, as discussed further below.

Figure 8:
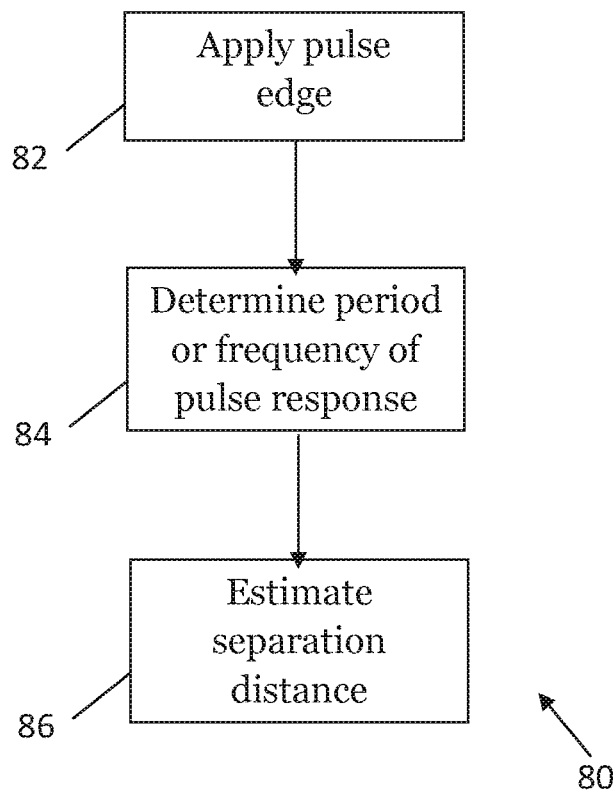
FIG. 8 is a flow chart showing an algorithm in accordance with an example embodiment.

FIG. 8 is a flow chart showing an algorithm, indicated generally by the reference numeral 80, in accordance with an example embodiment. The algorithm 80 shows an example use of the system 70.

The algorithm 80 starts at operation 82 where a pulse edge is applied to the resonant circuit 74. The pulse edge is a rising or falling edge generated by the pulse generation circuit 72.

Figure 9:
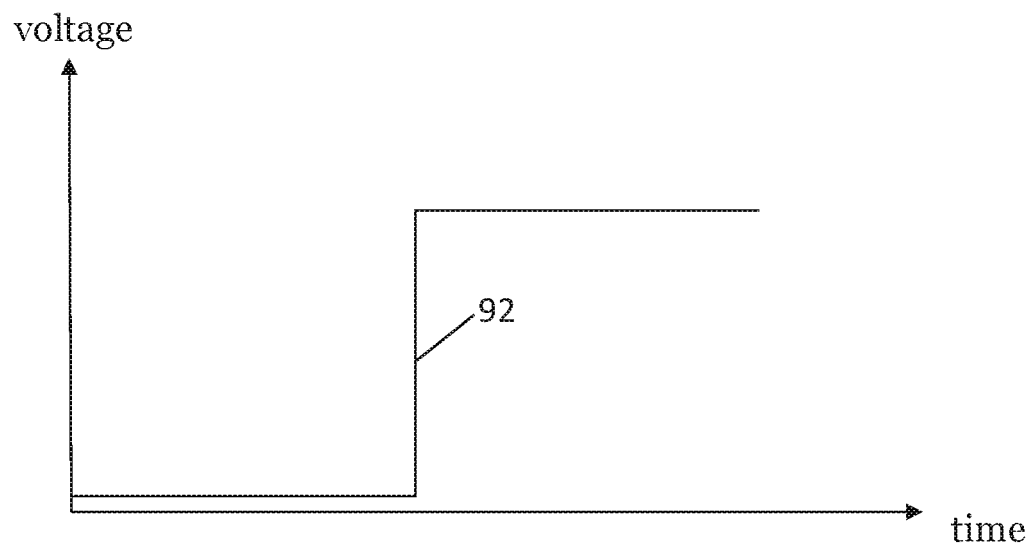
FIG. 9 is a plot showing a pulse in accordance with an example embodiment.

FIG. 9 is a plot showing a pulse 90 in accordance with an example embodiment. The pulse 90 is includes a rising pulse edge 92 that is an example of a pulse edge that may be applied in the operation 82. The pulse 90 may be generated by the pulse generation circuit 72. The pulse 90 may be applied to the resonant circuit 74.

The application of the pulse edge 92 to the resonant circuit generates a pulse response.

Figure 10:
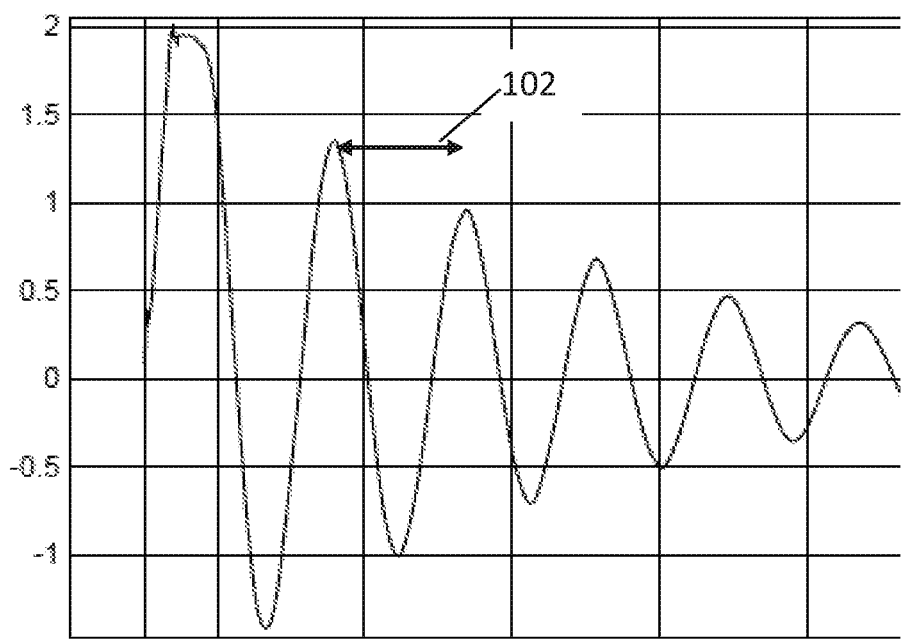
FIGS. 10 and 11 are plots showing pulse responses in accordance with example embodiments.

FIG. 10 is a plot, indicated generally by the reference numeral 100, showing an example pulse response that might be generated, for example at a connection point between the capacitor 66 and the inductor 63 of the resonant circuit 69 in response to the pulse edge 92. As shown in FIG. 10, the pulse response 100 may take the form of a ringing resonance. The pulse response is a result of charge bouncing between the inductor(s) and capacitor of the resonant circuit. In one arrangement, no heating of the susceptor is caused as a result. That is, the temperature of the susceptor remains substantially constant (e.g. within ±1° C. or ±0.1° C. of the temperature prior to applying the pulse). As shown in FIG. 10, the pulse response 100 has a resonant frequency having a period 102 (that period being the time between successive peaks of the ringing response).

Figure 11:
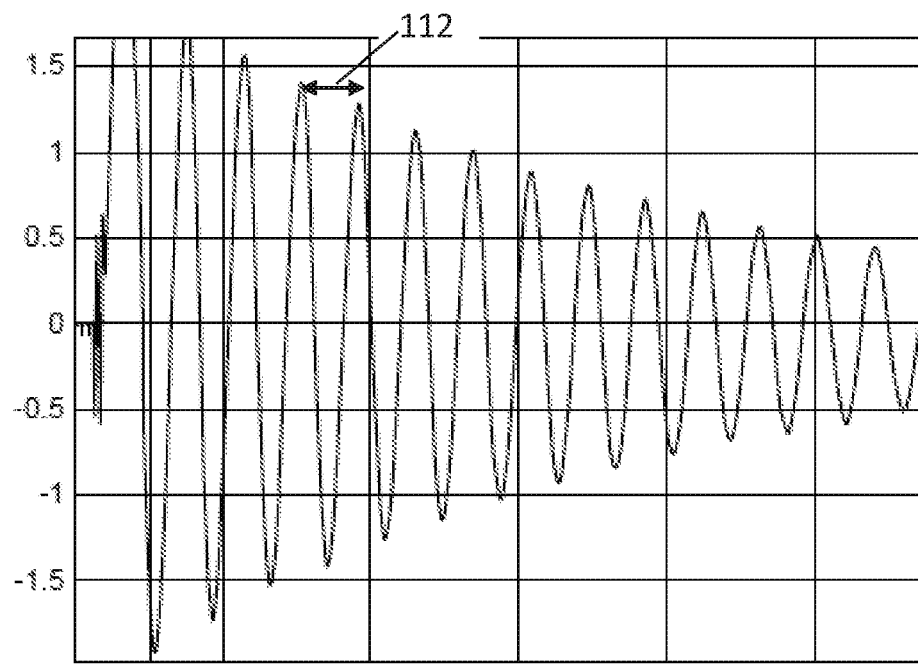

FIG. 11 is a plot, indicated generally by the reference numeral 110, showing another example pulse response that might be generated in response to the pulse edge 92. The pulse response 110 has a resonant frequency having a period 112 (that is shorter than the period 102).

At operation 84 of the algorithm 80, a period or frequency of the resonant frequency of the pulse response generated in response to the applied pulse edge is determined (e.g. by the pulse response processor 78). For the example pulse response 100, the period or frequency determined in the operation 84 is the period 102. Similarly, for the example pulse response 110, the period determined in the operation 84 is the period 112.

At operation 86 of the algorithm 80, the period or frequency determined in the operation 84 is converted into a separation distance based, at least in part, on a distance gradient and a first calibration measurement, wherein the distance is based on a separation between the inductive element and the susceptor and the first calibration measurement comprises the separation between the inductive element and the susceptor at a calibration temperature. Thus, the algorithm 80 can be used to implement a micrometer function.

Figure 12:
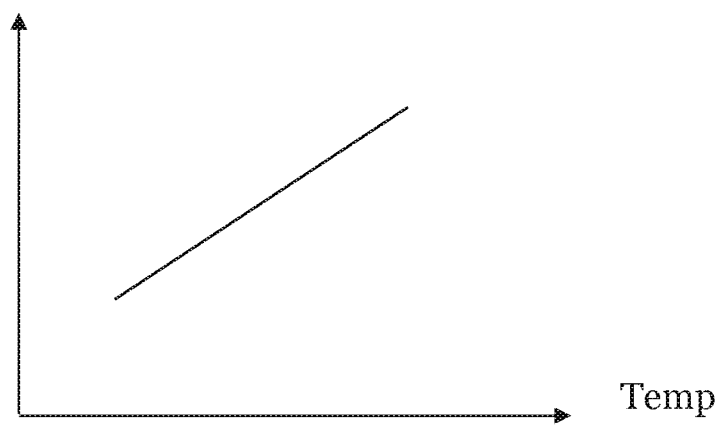
FIG. 12 is a plot showing a relationship between pulse response period and temperature in accordance with an example embodiment.

FIG. 12 is a plot, indicated generally by the reference numeral 120, showing a relationship between pulse response period and temperature in accordance with an example embodiment.

As an inductive heating system, such as the systems 10 and 30, warms, the resistances in the system change. This results in a change in the resonant frequency (and hence the period of the pulse response determined in the operation 84 described above). As shown in the example plot 120, the pulse response period may increase as the temperature increases. In some example embodiments, this change in linear (or almost linear) and so can be used for temperature measurement estimations.

If the characteristics of the plot 120 are known, then the period or frequency determined in the operation 84 can be converted into a temperature estimate, where the temperature (x) may be given by the formula:

$$x = \frac{y-c}{m}$$

where:
y is the period determined in the operation 84;
c is a calibration value; and
m is the gradient of the plot 120.

The gradient m can be determined from two data points (x1,y1) and (x2, y2) as follows:

$$m = \frac{y2 - y1}{x2 - x1}$$

The calibration value c may be given by:

$$c = -ma + b$$

where:
m is the gradient discussed above;
a is a calibration temperature (e.g. room temperature);
b is the pulse response period at the calibration temperature.

For example, assume that a pulse response period of 400 ns was measured at a calibration temperature of 20 degrees centigrade. If the gradient of the plot 120 has been determined to be 250 picoseconds per degree centigrade, then the values above are given by:

$$m = 250 \text{ ps/}° \text{ C.} = 0.25 \text{ ns/}° \text{ C.}$$

$$c = -0.250 * 20 + 400 = 395$$

Thus, if a period of 420 ns is determined in the operation 84, this can be converted in the operation 86 into a temperature estimate using the formula:

$$x = \frac{y - c}{m}$$

$$x = \frac{420 - 395}{0.250} = 100$$

Thus, the temperature estimate x is 100° C.

As discussed above, the period of the frequency response changes with temperature, such that the period can be used to determine temperature. The period of the frequency response is also related to the distance been the inductor of the resonant circuit and the susceptor. More specifically, as the distance between the inductor and the susceptor increases, the period of frequency response increases.

The temperature estimate algorithm described above calculates temperature using the formula:

$$x = \frac{y - c}{m}$$

Where y is the period of the frequency response and c and m are both constants. Thus, if y increases, then the temperature measurement x will increase.

It follows that if the separation between the inductor of the resonant circuit and the susceptor increases, the temperature measurement (i.e. the apparent temperature) will increase, even if the actual temperature has remained the same (e.g. at room temperature or some other constant operation temperature).

Figure 13:
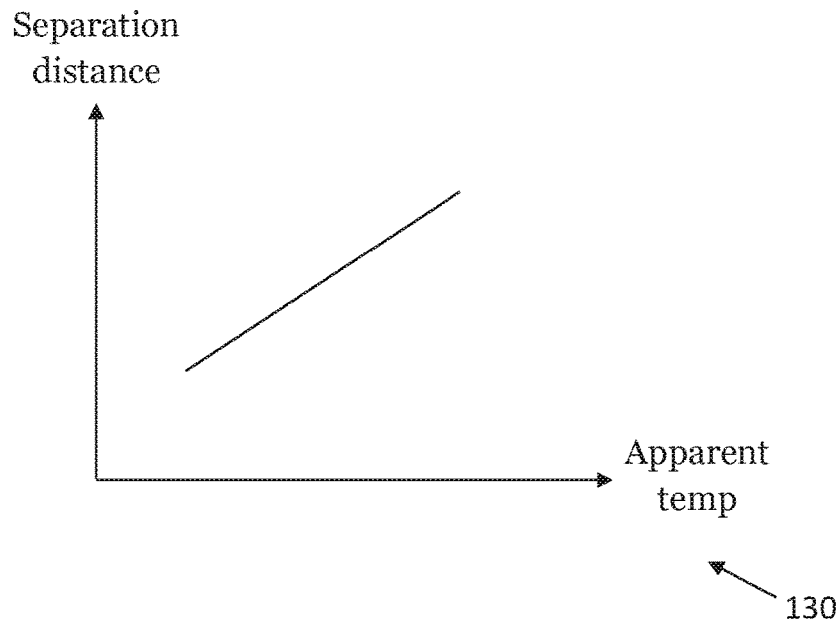
FIG. 13 is a plot showing a relationship between separation distance and apparent temperature in accordance with an example embodiment.

FIG. 13 is a plot, indicated generally by the reference numeral 130, showing a relationship between separation distance (e.g. a separation between the inductor 44 and the susceptor 46 of the system 40) and apparent temperature in accordance with an example embodiment. The apparent temperature is the output of the temperature estimation algorithm described above. The actual temperature during the generation of the plot 130 remained constant.

As shown in the example plot 130, the apparent temperature may increase as the separation between the inductor of the resonant circuit and the susceptor increases. In some example embodiments, this change in linear (or almost linear) and so the apparent temperature indication can be used for separation distance estimations.

The linear plot 130 has a gradient that is referred to herein as a distance gradient (i.e. the rate of change of separation distance with respect to apparent temperature). If a calibration distance at a calibration temperature (e.g. room temperature) is taken, then the separation distance can be determined on the basis of a determined apparent temperature.

For example, the separation distance (distance) plotted in FIG. 13 may be expressed as follows:

$$\text{distance} = mt_a + (d - mc)$$

where:
$t_a$ is the apparent temperature;
m is the gradient of the plot 130;
c is a calibration temperature (e.g. room temperature);
d is the separate distance at the calibration temperature.

By way of example, assume that the distance gradient (m) is 1.6 μm/° C., and the separation (d) is 550 μm when the apparent temperature (c) is the actual room temperature of 21° C. A later apparent temperature measurement ($t_a$) of 89° C. corresponds to a change in temperature of 68° C. That corresponds to a change in separation of 1.6×68=108.8 μm. Thus, if the temperature has in fact remained the sane, the new separation is about 660 μm.

Figure 14:
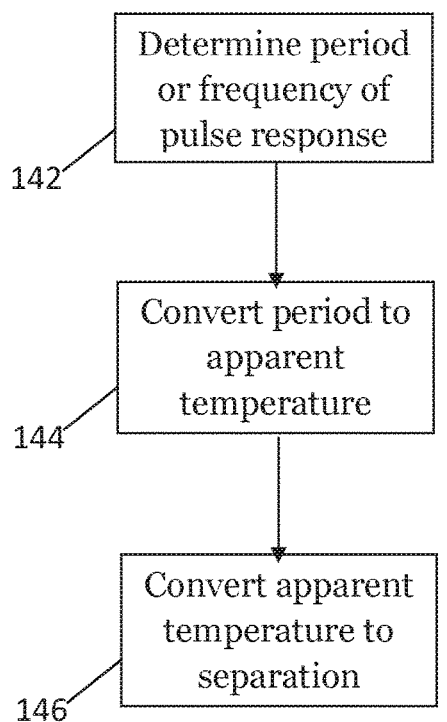
FIGS. 14 and 15 are flow charts showing algorithms in accordance with example embodiments.

FIG. 14 is a flow chart showing an algorithm, indicated generally by the reference numeral 140, in accordance with an example embodiment.

At operation 142 of the algorithm 140, a period or frequency of the resonant frequency of the pulse response generated is determined, for example in response to an applied pulse edge (as with the operation 84 of the algorithm 80 described above).

At operation 144, the period or frequency determined in the operation 142 is converted into an apparent temperature, for example based on the temperature gradient and temperature calibration measurement described above with reference to the plot 120.

At operation 146, the apparent temperature determined in the operation 144 is converted into a separation distance estimate, for example based on the distance gradient and the calibration measurement described above with reference to the plot 130.

The operations 144 and 146 are an example implementation of the operation 86 of the algorithm 80 described above. It should be noted that many variants of the algorithm 140 are possible. For example, the period or frequency of the pulse response, as determined in the operation 142, may be converted directly into a separation distance without the intervening conversion into an apparent temperature (such that the operations 144 and 146 are combined in a single operation).

Figure 15:
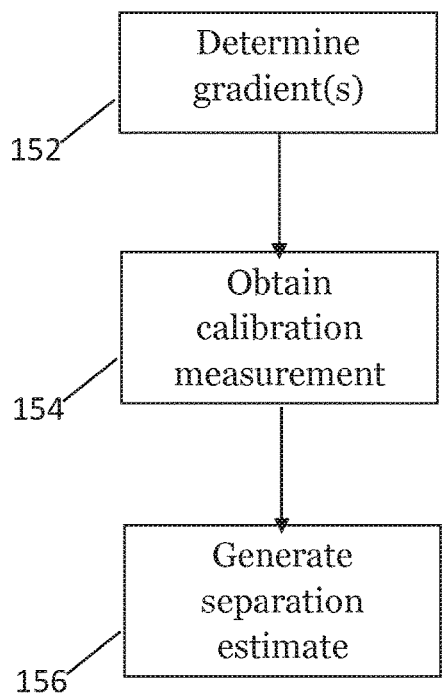

FIG. 15 is a flow chart showing an algorithm, indicated generally by the reference numeral 150, in accordance with an example embodiment. The algorithm 150 may be implemented using the system 70 described above.

At operation 152, one or more relevant gradients of the system 70 is/are determined. The gradients include a distance gradient based on the rate of change of separation distance with apparent temperature (e.g. the slope of the plot 130 described above) and may also include the rate of change of the resonant frequency of said pulse response (or the period of that pulse response) with respect to temperature (e.g. the slope of the plot 120 described above).

The gradient(s) may be generated once (as part of an initialization process) and may then be stored and not change (or only rarely changed). Alternatively, the gradient measurement(s) may be updated from time-to-time (e.g. periodically or in response to a determination that the gradient measurement may be unreliable).

At operation 154, one or more calibration measurements are obtained. A first calibration measurement is a separation distance at a known temperature (e.g. room temperature). The first calibration measurement and the distance gradient described above define the plot 130, thereby enabling an apparent temperature measurement to be converted into an estimate of separation distance (i.e. the operation 146 of the algorithm 140 described above).

A second calibration measurement that may be obtained in the operation 154 is a period of a resonant frequency at a known temperature (e.g. a measured temperature). For example, the system may be calibrated based on a known room temperature (e.g. during a calibration process). Thus, room temperature may be measured (e.g. using a thermocouple) and a pulse duration measured at this known room temperature. The second calibration measurement enables the plot 120 to be defined such that a period of a resonant response can be converted into an apparent temperature (i.e. the operation 144 of the algorithm 140 described above).

The calibration measurements may be a one-time measurement that is stored. Alternatively, the calibration measurement may be taken repeatedly, such as whenever the configuration of the system may have changed. There are many possible calibration arrangements. For example, for systems having removable article including a susceptor arrangement for heating, the system may be recalibrated each time the removable article is changed.

At operation 156, a separation estimate is generated. The operation 156 may be implemented using the algorithm 140 described above.

The system 40 described above represents one example implementation of the principles described herein; many variants are possible. For example, the susceptor may be provided as part of many alternative aerosol provision devices.

Figure 16:
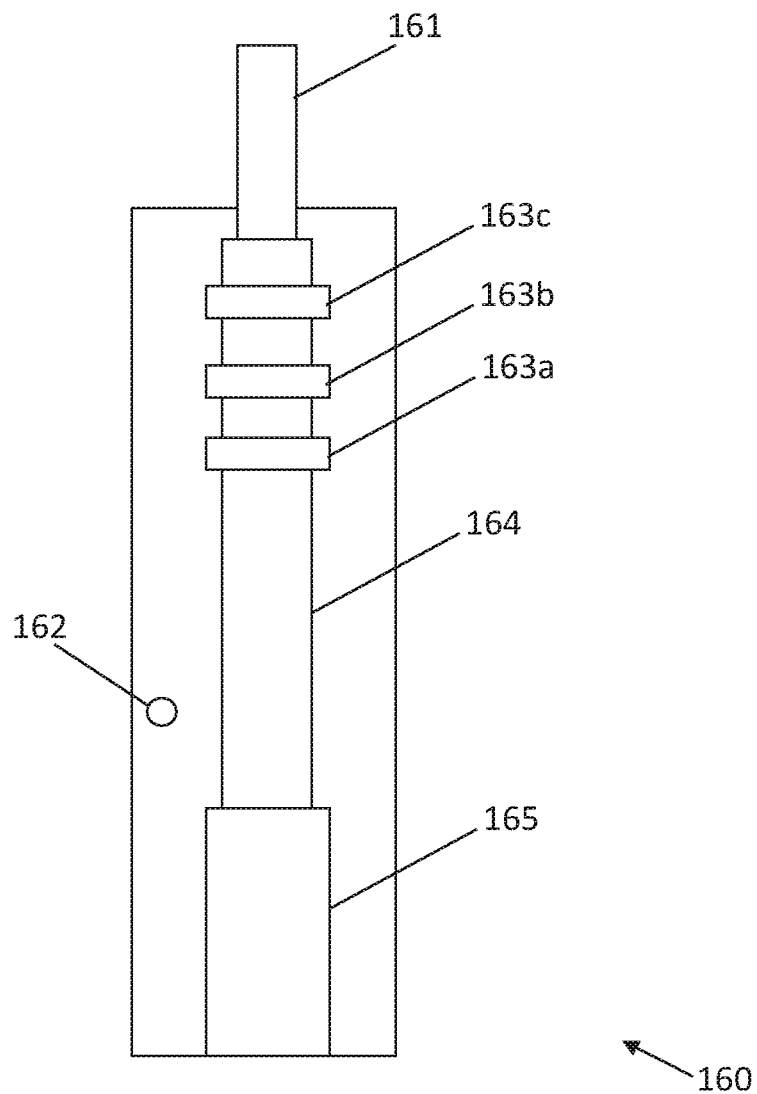
FIG. 16 depicts an aerosol delivery device in accordance with an example embodiment.

By way of example, FIG. 16 depicts an aerosol delivery device, indicated generally by the reference numeral 160, in accordance with an example embodiment.

The aerosol delivery device 160 comprises a replaceable article 161 that may be inserted in the aerosol delivery device 160 to enable heating of a susceptor comprised within the article 161 (or provided elsewhere). The aerosol delivery device 160 further comprises an activation switch 162 that may be used for switching on or switching off the aerosol delivery device 160, a plurality of inductive elements 163a, 163b, and 163c, and one or more air tube extenders 164 and 165. The one or more air tube extenders 164 and 165 may be optional.

A susceptor may be provided as part of the article 161. In an example embodiment, when the article 161 is inserted in the aerosol delivery device, the aerosol delivery device 160 may be turned on due to the insertion of the article 161. This may, for example, be due to detecting the presence of the article 161 in the aerosol delivery device using an appropriate sensor (e.g., a light sensor). When the aerosol delivery device 160 is turned on, the inductive elements 163 may cause the article 161 to be inductively heated through the susceptor. In an alternative embodiment, the susceptor may be provided as part of the aerosol delivery device 160 (e.g. as part of a holder for receiving the article 161).

The algorithms 140 and 150 described above may be used to estimate a separation between a susceptor of the article 161 and the inductive elements of the aerosol delivery device 160.

The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/or other aspects described herein are not to be considered limitations on the scope of the disclosure as defined by the claims or limitations on equivalents to the claims, and that other embodiments may be utilized and modifications may be made without departing from the scope of the disclosure. Various embodiments of the disclosure may suitably comprise, consist of, or consist essentially of, appropriate combinations of the disclosed elements, components, features, parts, steps, means, etc., other than those specifically described herein. In addition, this disclosure may include other inventions not presently claimed, but which may be claimed in future.

The invention claimed is:

1. A method comprising:
applying a pulse edge to a resonant circuit comprising an inductive element for inductively heating a susceptor, and a capacitor, wherein the applied pulse edge induces a pulse response between the capacitor and the inductive element of the resonant circuit, wherein the pulse response has a resonant frequency;
determining a period or a frequency of the resonant frequency of the pulse response; and
converting the determined period or the determined frequency into a distance based, at least in part, on a distance gradient and a first calibration measurement, wherein the distance is based on a separation between the inductive element and the susceptor and the first calibration measurement comprises the separation between the inductive element and the susceptor at a first calibration temperature.

2. The method as claimed in claim 1, wherein the distance gradient comprises a rate of change of distance with respect to apparent temperature.

3. The method as claimed in claim 1, wherein the first calibration temperature is room temperature.

4. The method as claimed in claim 1, wherein converting the determined period or the determined frequency into a distance estimate comprises:
converting the determined period or the determined frequency into an apparent temperature based on a temperature gradient and a temperature calibration measurement; and
converting the apparent temperature into the distance estimate based on the distance gradient and the first calibration measurement.

5. The method as claimed in claim 4, wherein the temperature gradient comprises a rate of change of the resonant frequency of the pulse response with respect to temperature.

6. The method as claimed in claim 4, wherein the temperature calibration measurement defines a first period of the resonant frequency of the pulse response and a first temperature.

7. The method as claimed in claim 4, the said temperature calibration measurement is obtained by subtracting a product of the temperature gradient and a second calibration temperature from a period or a frequency of the pulse response at the second calibration temperature.

8. The method as claimed in claim 1, further comprising obtaining the first calibration measurement.

9. The method as claimed in claim 1, further comprising determining the distance gradient.

10. The method as claimed in claim 1, wherein the pulse edge forms part of an off-resonance pulse.

11. A non-combustible aerosol generating device comprising the apparatus as claimed in claim 10.

12. The non-combustible aerosol generating device as claimed in claim 11, wherein the aerosol generating device is configured to receive a removable article comprising an aerosol generating material.

13. The non-combustible aerosol generating device as claimed in claim 12, wherein the aerosol generating material comprises an aerosol generating substrate and an aerosol forming material.

14. The non-combustible aerosol generating device as claimed in claim 12, wherein the removable article includes a susceptor arrangement.

15. An apparatus comprising:
a resonant circuit comprising an inductive element and a capacitor, wherein the inductive element is for inductively heating a susceptor;
a circuit for applying a pulse edge to the resonant circuit, wherein the applied pulse edge induces a pulse response between the capacitor and the inductive element of the resonant circuit, wherein the pulse response has a resonant frequency; and
a processor for determining a period or a frequency of the resonant frequency of the pulse response and converting the determined period or the determined frequency into a distance based, at least in part, on a distance gradient and a first calibration measurement, wherein the distance is based on a separation between the inductive element and the susceptor and the first calibration measurement comprises the separation between the inductive element and the susceptor at a first calibration temperature.

16. The apparatus as claimed in claim 15, wherein the distance gradient comprises a rate of change of distance with respect to apparent temperature.

17. The apparatus as claimed in claim 15, wherein the processor is for:
converting the determined period or the determined frequency into an apparent temperature based on a temperature gradient and a temperature calibration measurement; and
converting the apparent temperature into a distance estimate based on the distance gradient and the first calibration measurement.

18. The apparatus as claimed in claim 15, wherein the processor is for determining the distance gradient.

19. The apparatus as claimed in claim 15, wherein the inductive element and the capacitor are connected in series.

20. The apparatus as claimed in claim 15, wherein the inductive element and the capacitor are connected in parallel.

21. The apparatus as claimed in claim 15, wherein the circuit is an H-bridge circuit.

22. A kit of parts comprising an article for use in a non-combustible aerosol generating system, wherein the non-combustible aerosol generating system comprises the apparatus as claimed in claim 15.

23. The kit of parts as claimed in claim 22, wherein the article is a removable article comprising an aerosol generating material.

24. A non-transitory computer-readable storage medium storing a computer program comprising instructions which, when executed by a processor, cause an apparatus comprising the processor to perform at least the following:
applying a pulse edge to a resonant circuit comprising an inductive element, for inductively heating a susceptor, and a capacitor, wherein the applied pulse edge induces a pulse response between the capacitor and the inductive element of the resonant circuit, wherein the pulse response has a resonant frequency;
determining a period or a frequency of the resonant frequency of the pulse response; and
converting the determined period or the determined frequency into a distance based, at least in part, on a distance gradient and a first calibration measurement, wherein the distance is based on a separation between the inductive element and the susceptor and the first calibration measurement comprises the separation between the inductive element and the susceptor at a first calibration temperature.

\* \* \* \* \*